United States Patent

Rubenstein et al.

[15] 3,638,546
[45] Feb. 1, 1972

[54] CONSTANT SCALE PANORAMIC CAMERA

[72] Inventors: Robert Aaron Rubenstein; John Thaxter Watson, both of Framingham, Mass.

[73] Assignee: Itek Corporation, Lexington, Mass.

[22] Filed: Jan. 20, 1970

[21] Appl. No.: 4,251

[52] U.S. Cl. ....................................................95/15, 95/12.5
[51] Int. Cl. ..........................................................G03b 37/00
[58] Field of Search ...............................................95/15, 12.5

[56] References Cited
UNITED STATES PATENTS

| | | | |
|---|---|---|---|
| 1,136,761 | 4/1915 | Becker | 95/15 |
| 3,468,230 | 9/1969 | Bellows | 95/15 |

*Primary Examiner*—Samuel S. Matthews
*Assistant Examiner*—Richard L. Moses
*Attorney*—Homer O. Blair and Robert L. Nathans

[57] ABSTRACT

A method and apparatus are disclosed for maintaining a constant image scale in a panoramic camera by modifying the size of the image at the film in a first direction as a function of the scan angle and in a second direction as that function squared of the scan angle.

10 Claims, 5 Drawing Figures

JOHN T. WATSON
ROBERT A. RUBENSTEIN
INVENTORS.

BY Joseph S. Iandiorio

ATTORNEY.

CONSTANT SCALE PANORAMIC CAMERA

CHARACTERIZATION OF INVENTION

The invention is characterized in a constant scale panoramic camera comprising means for modifying the size of the image at the film in a first direction as a function of the scan angle and in a second direction as the square of that function of the scan angle.

BACKGROUND OF INVENTION

This invention relates to constant scale panoramic cameras.

In conventional panoramic cameras the scale of the image is not constant over the entire scan. As the scan angle increases the size of the image relative to the object is reduced proportionally. The inconstant scale of the photographs necessitates a rectification of the photograph for proper viewing. Further, since the scale decreases with increasing scan angle, the images of objects photographed appear smaller with increasing scan angle so that much information may be lost.

SUMMARY OF THE INVENTION

Thus it is desirable to have available a constant scale panoramic camera.

It is also desirable to have available such a camera for providing panoramic photographs suitable for direct measurement and mosaic production.

It is also desirable to have available such a camera having higher acuity at large scan angles than conventional panoramic cameras.

The invention may be accomplished by means for modifying the size of the image at the film in panoramic cameras in a first direction as a function of the scan angle and in a second direction as the square of that function of the scan angle.

DISCLOSURE OF PREFERRED EMBODIMENT

Other objects, features and advantages will occur from the following description of a preferred embodiment and the accompanying drawings, in which.

A constant scale panoramic camera may be constructed with a cylindrical variable focal length lens system to vary the image size at the film in the scan direction and a spherical variable focal length lens system to vary the image size at the film in the scan direction and in the direction perpendicular to the scan direction. A function generator which produces a signal that is a function of the reciprocal of the cosine of the scan angle drives both lens systems in accordance with the constantly changing scan angle. A transducer may be associated with the scanning device to sense the scan angle and provide an input signal representative thereof to the function generator.

Figure 1:
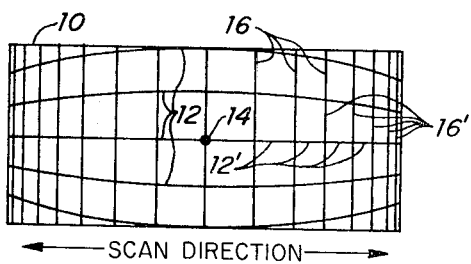
FIG. 1 is a representation of the effect of the inconstant scale of the image on a photograph of a uniform grid on the ground.

The effect of the inconstant scale may be seen in FIG. 1, where a photograph 10 of a uniform grid on the ground is shown. The scale along lines 12 in the same general direction as the scan direction becomes increasingly smaller as distance from the center point 14 increases with increase in the scan angle. This is demonstrated by the increasingly shorter increments 12' between crosslines 16 as the distance from point 14 increases. The scale of lines 16 perpendicular to the scan direction is also increasingly reduced as distance from point 14 increases, as demonstrated by the increasingly shorter increments 16' as the distance from point 14 increases. In the direction of the scan, reduction of the scale of the image occurs at a rate proportional to the square to the cosine of the scan angle, whereas in the direction perpendicular to the scan, the reduction in scale of the image occurs at a rate proportional to the cosine of the scan angle.

Figure 2:
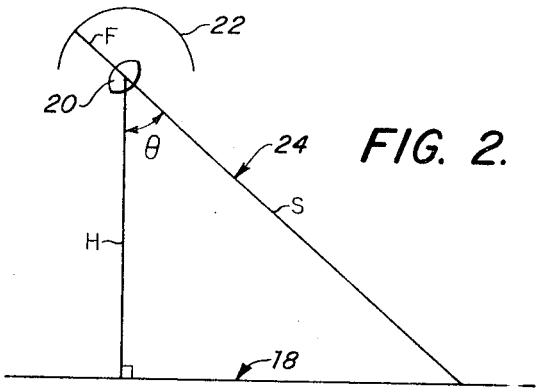
FIG. 2 is a sketch of the geometric relationships in panoramic photography which cause variations in the scale of the image and resulting photograph in the scan direction and in a direction perpendicular to the scan direction, as a function of the scan angle.

The first order scale reduction of the image is caused by the lengthening of the slant distance S, FIG. 2, between the lens and object as the scan angle increases. At zero scan angle the distance between the ground 18 and lens 20 is H. As the scan angle $\theta$ increases in either direction, the distance S between the lens 20 and ground 18 increases. However, the focal length F along the optic axis 23 between lens 20 and film 22 is constant. Thus, as the scan angle $\theta$ increases, the object area viewed becomes larger while the image size at film 22 remains the same. As a result, the scale of the image is reduced with increasing scan angle: the scale is not constant.

The distance S, thus the variation in the scale, varies as a function of the scan angle $\theta$, more particularly as a function the cosine of the scan angle $\theta$:

$$\cos \theta = H/S, \text{ and}$$
$$S = H/\cos \theta.$$

As the scan angle $\theta$ increases, the cos $\theta$ decreases, and so S increases, causing reduction in the scale of the image at film 22. This reduction scales down the image in two directions. Thus, the lines both in the scan direction and in the direction perpendicular to the scan direction are reduced in length as a function of the cosine of the scan angle.

Figure 3:
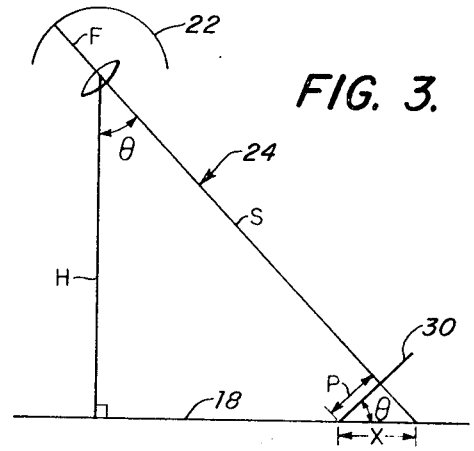
FIG. 3 is a sketch of the geometric relationships in panoramic photography which cause an additional variation in the scale of the image and photograph in the scan direction as a function of the scan angle.

The second order scale reduction occurs only in the scan direction and is caused by the fact that the focal plane direction 30, FIG. 3, which is perpendicular to the optic axis 24, becomes more and more inclined to the ground 18 as the scan angle $\theta$ increases. As the focal plane 30 becomes more inclined to ground 18, the area viewed by the lens 20 on the ground 18 becomes longer in the scan direction, but the image size projected to the focal plane does not, so that the scale of the objects in the scan direction are reduced again.

Figure 4:
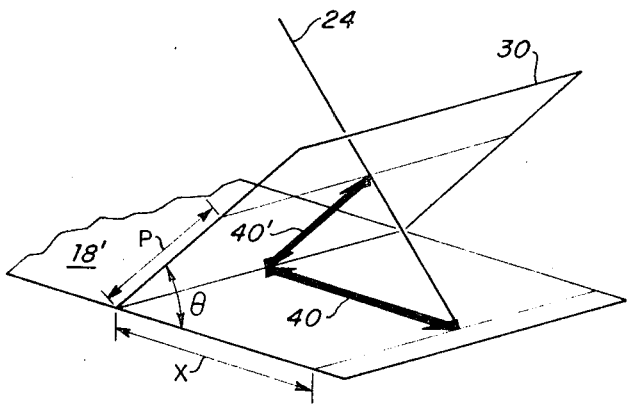
FIG. 4 is a perspective sketch showing the intersection of the optic axis of the camera, the ground plane and the focal plane of the camera demonstrating the reduced scale of the image in the focal plane as projected from an object on the ground.

In FIG. 3 the length X viewed on the ground becomes greater with increases in the scan angle $\theta$. This is illustrated in FIG. 4 where an object 40 of length X, elongated in the scan direction and lying in the ground plane 18', is projected onto the focal plane 30 as image 40' of reduced length P. That reduction of the scale of the image 40' is a function of the cosine of the scan angle $\theta$:

$$\cos \theta = P/X, \text{ or}$$
$$P = X \cos \theta.$$

The combination of the first and second order scale reductions causes the scale of the image to be varied as a function of the square of the cosine of the scan angle $\theta$ in the scan direction and as a function of the cosine of the scan angle $\theta$ in the direction perpendicular to the scan direction.

Figure 5:
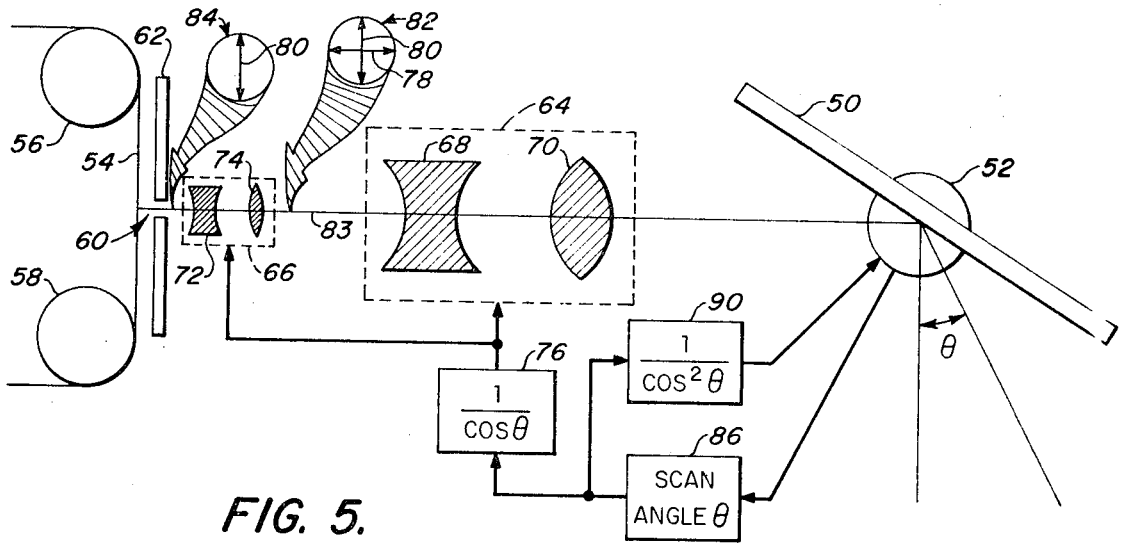
FIG. 5 is a schematic view of a front mirror scanning type panoramic camera with variable focal length lens systems according to the invention.

Both orders of variations of the scale of the image may be compensated for to maintain a constant scale throughout the scan by apparatus as shown in FIG. 5 in a front scanning panoramic camera.

Scanning mirror 50 is rotated by motor 52 to scan the area of interest and direct the radiation therefrom to film 54 on rollers 56 and 58 through slit 60 in plate 62. Between mirror 50 and slit 60 are a conventional zoom lens system 64 and an anamorphic zoom lens system 66. System 64 may contain simply a negative spherical lens 68 and positive spherical lens 70, or a more complex "zoom" lens apparatus; and system 66 may contain a negative cylindrical lens 72 and positive cylindrical lens 74. System 64 is driven by function generator 76 to vary the size of the image at film 54 as a function of the reciprocal of the cosine of the scan angle ($1/\cos \theta$). System 64 magnifies the image projected to film 54 in both directions as indicated by lines 78 and 80 in rotated, removed, enlarged cross section view 82 of incoming radiation 83. System 66 is also driven by function generator 76 to vary the size of the image in one direction at film 54 as a function of the reciprocal of the cosine of the scan angle ($1/\cos \theta$). System 66 magnifies the image projected to film 54 in one direction as indicated by line 80 in rotated, removed, enlarged cross section view 84 of the incoming radiation 83. Transducer 86 associated with motor 52 provides an input signal representative of the scan angle of mirror 50 to function generator 76 and generator 90.

Since the mirror 50 is sweeping larger and larger dimensions as a function of $\cos^2\theta$ in the direction of the scan as the scan angle $\theta$ increases, either the film 54 or the mirror 50 must have its motion modified by a function of $\cos^2\theta$ in order to continually provide the image with the proper quantity of film. This may be accomplished either by varying the velocity $V_2$ of film 54, as a function of $\cos^2\theta$, in which case the width of the slit 60 would also have to be similarly varied in order to maintain proper exposure of the film at increased velocities, or by varying the velocity $V_2$ of mirror 50 as a function of $\cos^2\theta$ in which case, the width of slit 60 may remain fixed. The latter alternative is implemented in FIG. 5 by a function generator 90 driven by transducer 86 to provide a signal that is a function of $1/\cos \theta$ to motor 52 to decrease the rotational speed of mirror 50 as the scan angle $\theta$ increases.

The image size in the scan direction, line 80, has thus been varied as a function of the reciprocal of the square of the cosine of the scan angle and the image size has been varied in the direction perpendicular to the scan direction as a function of the reciprocal of the cosine of the scan angle. Thereby, the enlargement of the object with increasing scan angle has been exactly compensated.

Other embodiments will occur to those skilled in the art and are within the following claims.

What is claimed is:

1. A constant scale panoramic camera comprising means for modifying the size of the image at the film in a first direction as a function of the scan angle and in a second direction as the square of said function of the scan angle and including, a first optical system for varying the size of the image in said first and said second directions, and a second optical system for varying the size of the image in said second direction.

2. The camera of claim 1 in which said means for modifying further includes function generator means for driving said first and second optical systems as a function of the scan angle.

3. The camera of claim 2 in which said means for modifying further includes means for sensing the scan angle of the scanning means to drive said function generator as a function of the scan angle.

4. The camera of claim 1 in which said function generator includes means for generating a function of the reciprocal of the cosine.

5. The camera of claim 1 in which said first optical system includes a spherical variable focal length lens system and said second optical system includes an anamorphic variable focal length lens system.

6. The camera of claim 1 in which said first direction is in the direction perpendicular to the scan direction and said second direction is parallel to the scan direction.

7. The camera of claim 6 in which said function of the scan angle is the reciprocal of the cosine of the scan angle and said function squared is the reciprocal of the square of the cosine of the scan angle.

8. The camera of claim 6 in which said first optical system includes a spherical variable focal length lens system, and said second optical system includes an anamorphic variable focal length lens system.

9. The camera of claim 8 in which said camera includes means for positioning said spherical variable focal length lens system and said anamorphic variable focal length in the camera at a position in which each lens system forms an image along it optical axis.

10. The camera of claim 9 in which said function of the scan angle is the reciprocal of the cosine of the scan angle, and said function squared is the reciprocal of the square of the cosine of the scan angle.

* * * * *